US006608927B2

United States Patent
Ohta

(10) Patent No.: US 6,608,927 B2
(45) Date of Patent: *Aug. 19, 2003

(54) COLOR IMAGE PROCESSING METHOD AND APPARATUS UTILIZING THE SAME

(75) Inventor: Ken-ichi Ohta, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,002

(22) Filed: Apr. 27, 1998

(65) Prior Publication Data

US 2001/0035966 A1 Nov. 1, 2001

Related U.S. Application Data

(62) Division of application No. 08/917,296, filed on Aug. 25, 1997, which is a continuation of application No. 08/412,583, filed on Mar. 29, 1995, now abandoned.

(30) Foreign Application Priority Data

Mar. 31, 1994 (JP) .............................................. 6-063405
Mar. 31, 1994 (JP) .............................................. 6-063408

(51) Int. Cl.$^7$ ................................................ G06K 9/00
(52) U.S. Cl. ....................................... 382/167; 358/518
(58) Field of Search ............................... 358/518–520, 358/523, 530, 539; 382/162, 167

(56) References Cited

U.S. PATENT DOCUMENTS

| 4,758,885 A | * | 7/1988 | Sasaki et al. ................... 358/80 |
| 5,126,838 A | * | 6/1992 | Ohsawa et al. ................ 358/75 |
| 5,130,819 A | * | 7/1992 | Ohta ............................ 358/445 |
| 5,377,025 A | * | 12/1994 | Spaulding et al. ........... 358/518 |
| 5,402,253 A | * | 3/1995 | Seki ............................ 358/518 |
| 5,448,380 A | * | 9/1995 | Park ............................ 358/520 |
| 5,699,489 A | | 12/1997 | Yokomizo .................... 395/109 |
| 5,801,855 A | * | 9/1998 | Ohta ............................ 358/518 |

FOREIGN PATENT DOCUMENTS

| EP | 0 531 891 | | 3/1993 | |
| EP | 0534871 | * | 3/1993 | ............ H04N/1/46 |
| EP | 0584690 | * | 3/1994 | ............ H04N/1/46 |
| JP | 1-186094 | | 7/1989 | |
| JP | 4-078896 | | 3/1992 | |
| JP | 5-292303 | | 11/1993 | |
| JP | 7-177367 | | 7/1995 | |
| WO | WO92/06557 | * | 4/1992 | ............ H04N/1/46 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

A color image processing apparatus converts a first color signal (RGB signal) stored in a frame memory for displaying on, e.g., a CRT color monitor into a third color signal (R'G'B' signal) whose color image information is used for permanent visible representation by a printer, and outputs the third signal in order to effectively adjust differences between color gamuts of different devices. In the conversion processing, a conversion function for directly converting the first color signal into the third color signal is obtained by synthesizing three functions, namely, a first conversion function for converting the first color signal into a standard color space signal, a second conversion function for converting the standard color space signal into the third color signal, and a third conversion signal for converting the standard color space signal into another standard color signal suitable for a color gamut of the printer. The first color signal is converted into the third color signal in accordance with the new synthesized conversion function.

4 Claims, 12 Drawing Sheets

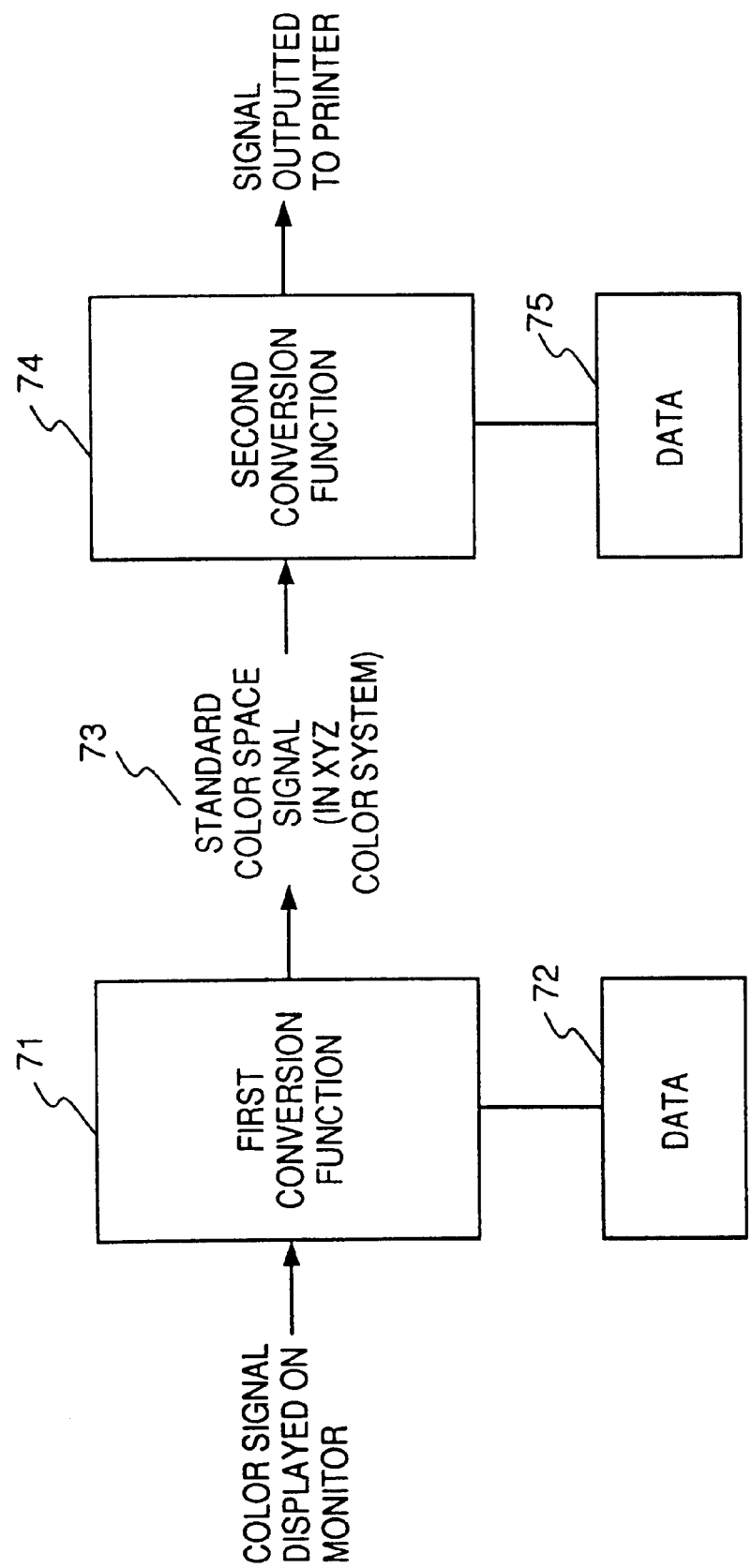

COLOR IMAGE PROCESSING METHOD AND APPARATUS UTILIZING THE SAME

This application is a division of application Ser. No. 08/917,296 filed Aug. 25, 1997, now allowed, which was a continuation of application Ser. No. 08/412,583 filed Mar. 29, 1995, now abandoned.

BACKGROUND OF THE INVENTION

This invention relates to a color image processing method and an apparatus utilizing the same and, more particularly, to a color image processing method and an apparatus utilizing the same for obtaining identical color reproduction characteristics between apparatuses, e.g., a color image input device, a display device, and an output device, having different color reproduction characteristics from each other.

Conventionally, a CRT color monitor reproduces an image by using additive color mixing in which luminance signals, for each RGB phosphor, are changed, whereas a color printer reproduces an image by using subtractive color mixing in which ink density of each YMCK color is changed. Therefore, when an image displayed on such a CRT color monitor is reproduced by an ink-jet type color printer, for instance, the color displayed on the monitor and the color outputted by the color printer are quite different from each other in most cases because of the different color reproduction characteristics of these two devices.

Further, since a color reproducible range (color gamut) of a printer is much smaller than that of a color monitor because the principles of the color reproduction methods of these two devices differ, it is impossible to reproduce all the colors displayed on the color monitor by the printer.

As a result, although an image is displayed on the color monitor with different tones, the printer may output an image that is deteriorated and has fewer tones, which has been a conventional problem.

For the sake of solving the problem, there are proposed a plurality of methods of obtaining identical color reproduction characteristics by analyzing the color reproduction characteristics of the monitor and the printer in advance and compensating for color differences between the two devices (color matching process).

As an example of those methods, there is one shown in FIG. 12. In FIG. 12, reference numeral 71 denotes a first conversion function for converting a first color signal representing a color on a monitor into a standard color signal, and reference numeral 72 denotes data showing color reproduction characteristics of the monitor analyzed in advance. Coefficients of the first conversion function are determined based on the data. Note, a standard color space signal 73 is expressed in the XYZ color system defined by the CIE (Comission Internationale de l'Eclairage) in 1931. Further, reference numeral 74 denotes a second conversion function for converting the standard color space signal 73 expressed by the XYZ color system into a second color signal for printer output, and reference numeral 75 denotes data showing color reproduction characteristics of the printer. The second conversion function is determined in accordance with the data.

More specifically, the idea illustrated in FIG. 12 is to convert an image on the monitor into an image outputted by the printer having an identical color reproduction characteristics to those of the monitor by using the two conversion functions via the standard color space signal which is expressed in the XYZ color system.

In the aforesaid method, however, a color signal is converted twice by operating the two conversion functions, thus it requires considerable processing time. It is possible to make another function by synthesizing the two functions in advance, then perform conversion of the color signal. However, when characteristics of a device to be used are changed or a conversion result is to be outputted to another device having different output characteristics, the synthesized function must be generated each time, which makes an operational sequence of the image processing complicated.

Furthermore, when the XYZ color system is employed as the standard color space, there is a problem in that quantization error during signal conversion becomes large, which causes deterioration of the image.

In addition, since the second conversion function includes a process to adjust differences between the color gamuts of devices, it is difficult to change only part of the adjusting process, or select the adjusting process out of plural kinds of processes.

SUMMARY OF THE INVENTION

Accordingly, it is an object of the present invention to provide a color image processing apparatus capable of performing color conversion flexibly by easily adjusting differences of color reproduction characteristics between different devices.

According to the present invention, the foregoing object is attained by providing a color image processing apparatus comprising: memory means for storing a first conversion function for converting a first color image signal into a signal in a predetermined color space and a second conversion function for converting the signal in the predetermined color space into a second color image signal, and a third conversion function used for performing a color signal conversion in consideration with color gamuts of units, which output the first and the second color image signals, in the predetermined color space; first synthesize means for obtaining a fourth conversion function by synthesizing the third conversion function and at least the first or the second conversion functions; and first conversion means for converting the first color image signal into the second color image signal by operating the fourth conversion function obtained by the first synthesize means.

It is another object of the present invention to provide a color image processing method of performing color conversion flexibly by easily adjusting differences of color reproduction characteristics between different devices.

According to the present invention, the foregoing object is attained by providing a color image processing method, based on a first conversion function used for converting a first color image signal into a signal in a predetermined color space, a second conversion function used for converting the signal in the predetermined color space into a second color image signal, and a third conversion function used for performing color signal conversion in consideration with color gamuts, in the predetermined color space, of units which output the first and the second color image signals, where all of the functions are stored in a storage medium, comprising: synthesize step of obtaining a fourth conversion function by synthesizing the third conversion function and at least the first or the second conversion functions; and conversion step of converting the first color image signal into the second color image signal by operating the fourth conversion function obtained in the synthesize step.

In accordance with the present invention as described above, in order to adjust the differences between color gamut of the first color image signal and color gamut of the second color image signal, by using the first conversion function for converting the first color image signal into the signal in a predetermined color space and the second conversion function for converting the signal in the predetermined color space into the second color image signal, and the third conversion function used for performing the color signal conversion in consideration with color gamuts of units which output the first and the second color image signals in the predetermined color space, a fourth conversion function is obtained by synthesizing the third conversion function and at least the first or the second conversion functions, and the first color image signal is converted into the second color image signal by operating the fourth conversion function.

The invention is particularly advantageous since the adjustment of the differences between the color gamut including the first color image signal and the color gamut including the second color image signal is performed by using the third conversion function, the adjustment can be easily and more flexibly performed by only changing, adding, or selecting the third conversion function. Further, selection designating processes regarding color characteristics of input image signal, a method of color matching process, and color characteristics of an output image signal are performed independently, thus it is easy to select, add, and change each process.

As a result, it becomes possible to arrange a system for effectively adjusting color reproduction characteristics between different devices.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram showing procedure of color conversion according to a conventional example.

DETAILED DESCRIPTION OF THE PREFERRED EMBODIMENTS

Preferred embodiments of the present invention will be described in detail in accordance with the accompanying drawings.

Figure 1:
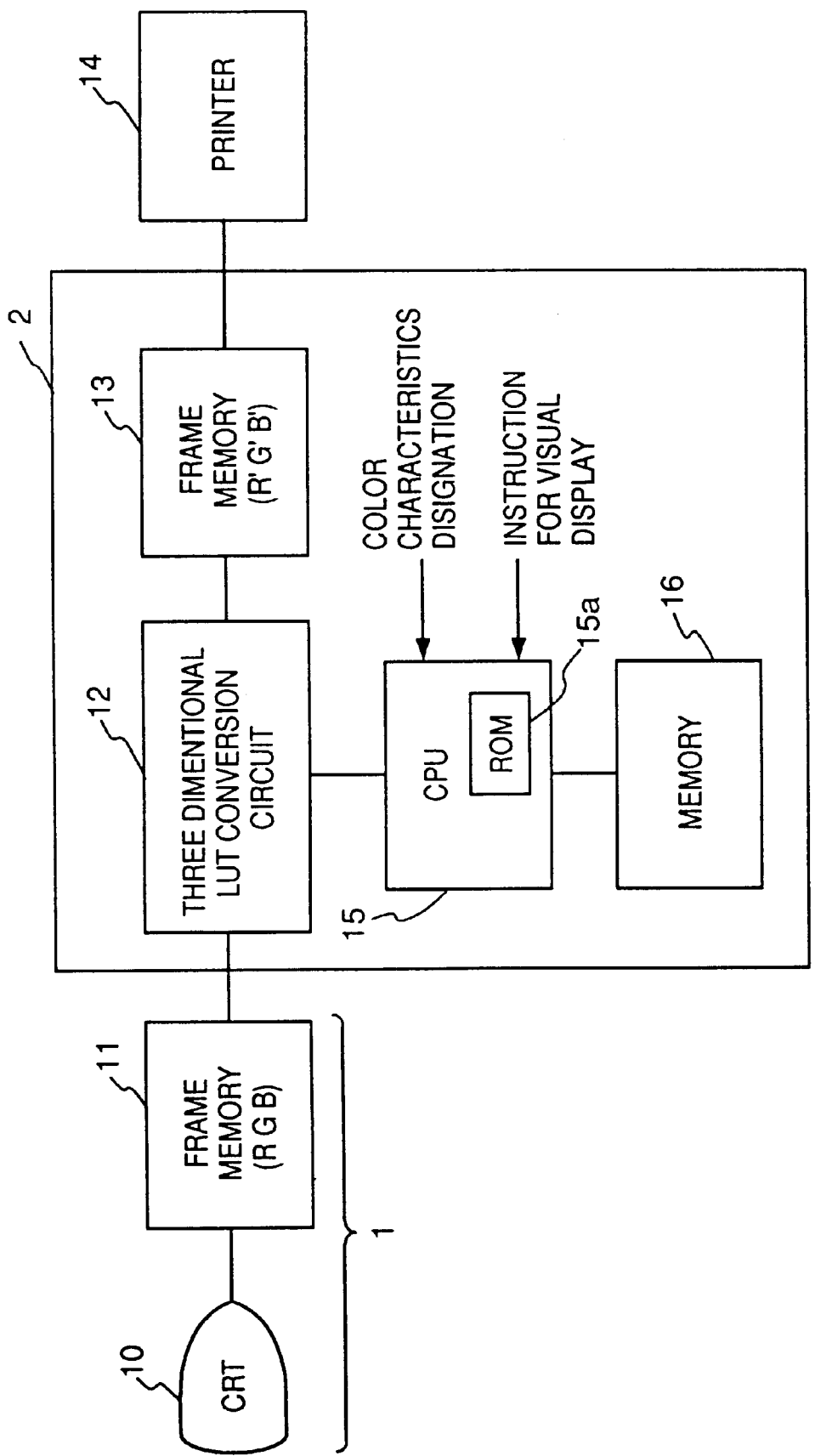
FIG. 1 is a block diagram illustrating a configuration of an image processing system as a typical embodiment of the present invention.

FIG. 1 is a block diagram illustrating a configuration of an image processing system as a typical embodiment of the present invention. This system comprises a display 1, a color conversion unit 2, and an electrophotographic type color printer 14. An image displayed on a CRT monitor 10 of the display 1 is outputted to the color printer 14 via the color conversion unit 2. In FIG. 1, reference numeral 10 denotes the CRT color monitor; 11, a frame memory for storing color image signals (RGB signals) to be displayed on the CRT color monitor 10; 12, a three dimensional look-up table (LUT) conversion circuit for performing color signal conversion; 13, a frame memory for storing converted R'G'B' signals; 15, a CPU; 15a a ROM for storing a control program to be executed by the CPU 15; and 16, a memory for storing a plurality of color signal conversion functions or conversion coefficients for converting color signals. Note that, when the CPU 15 executes the program stored in the ROM 15a, it reads the plurality of color signal conversion functions stored in the memory 16, and executes the conversion processing, e.g., by controlling, a RAM (not shown) used as a work area.

Regarding the three dimensional LUT conversion circuit 12, its detailed configuration will be described later.

The frame memory 13 transmits a R'G'B' signal obtained by the three dimensional LUT conversion circuit 12 to the color printer 14 which outputs a visual image. Further, the CPU 15 reads the plurality of color signal conversion functions or conversion coefficients stored in the memory 16, then sets the read functions or coefficients to the three dimensional LUT conversion circuit 12, and controls execution of signal conversion.

It should be noted that the CPU 15 comprises a designating unit (not shown) capable of designating color characteristics and inputting a visual display instruction (to output an image displayed on the display 1 to the color printer 14) from the outside. The designating unit may be, for example, a keyboard or a numeric keyboard, or have a configuration capable of connecting to a floppy disk drive which can read information in a floppy so that a large amount of color characteristic information (e.g., conversion coefficients corresponding to a plurality of devices), designation, and instructions can be inputted at a time.

Further, when the memory 16 stores color characteristics of plural kinds of displays and color printers which may be used as color signal conversion functions or conversion coefficients, it is possible to construct the apparatus such that it uniquely relates the color characteristics of the devices to a specific number, symbol, character string, or the like. Thus, the selective input of the specific number, symbol and character string from the designating unit enables the apparatus to designate the color characteristics. The designation of color characteristics in the following explanation is performed by using the above-mentioned approach.

Figure 2:
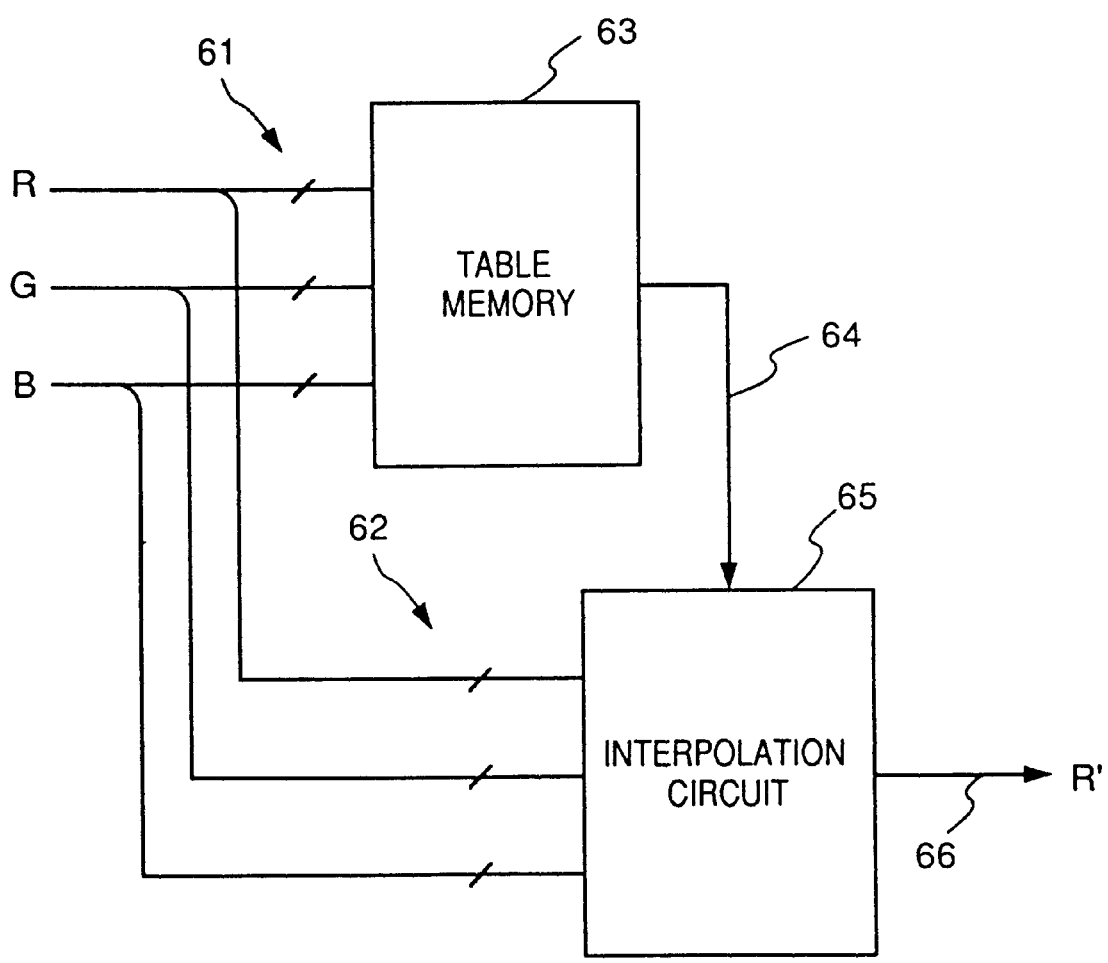
FIG. 2 is a block diagram illustrating a configuration of a three dimensional look-up table conversion circuit 12.

FIG. 2 is a block diagram illustrating a configuration of the three dimensional LUT conversion circuit 12. According to the configuration, an input RGB signal is divided into upper bit(s) data 61 and lower bit(s) data 62, and a table memory 63 stores output signals corresponding only to the upper bit(s) data, and the output value 64 corresponding to the upper bit(s) data 61 is inputted into an interpolation circuit 65. Meanwhile, the lower bit(s) data 62 is inputted into the interpolation circuit 65 where the output value 64 is linearly interpolated by using the lower bit(s) data 62 to obtain an output signal 66. In FIG. 2, only a R' signal is shown as the output signal 66, however, G' and B' signals are also outputted after being applied with the same process as described above, needless to say.

As described above, using the table memory 63 and the interpolation processing and converting the RGB signal into the R'G'B' signal, the signal conversion can be performed by re-writing contents of the table memory 63 when not only matrix conversion but also an arbitrary conversion function are used. The content of the table memory 63 is determined in an operational sequence which will be described later.

Figure 3:
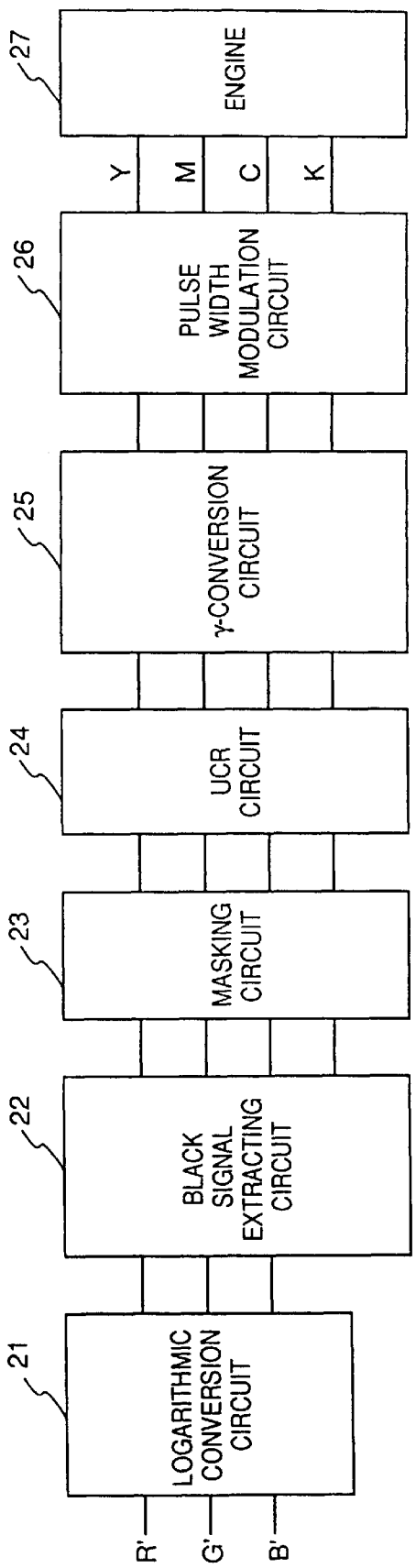
FIG. 3 is a block diagram illustrating a detailed configuration of a color printer 14.

FIG. 3 is a block diagram illustrating a detailed configuration of the color printer 14. As shown in FIG. 3, the color printer 14 includes a logarithmic conversion circuit 21, a black signal extracting circuit 22, a masking circuit 23, a UCR circuit 24, a γ-conversion circuit 25, a pulse width modulation circuit 26, and a printer engine 27.

When a R'G'B' signal is inputted from the frame memory 13 to the color printer 14, the R'G'B' signal is converted into a YMC signal at the logarithmic conversion circuit 21. The YMC signal is converted into a YMCK signal after being applied with well-known color correction processes at the black signal extracting circuit 22, the masking circuit 23, the UCR circuit 24, and the γ-conversion circuit 25. Each color component of the YMCK signal is applied with the pulse width modulation by the pulse width modulation circuit 26, and eventually becomes a pulse signal which triggers emission of a laser beam for electrophotographically forming an image on an electrostatic drum. The pulse signal is transmitted to the printer engine 27 which drives a semiconductor laser (not shown), to emit the laser beam. The laser beam is controlled by a polygon mirror rotating at high speed so as to scan the electrostatic drum (not shown), thereby a latent image is formed on it. The latent image is developed to a visual image with toner of four colors, namely, Y, M, C, and K, then transferred to a print sheet and fixed. Then, the color printer 14 discharges the print sheet.

Figure 4:
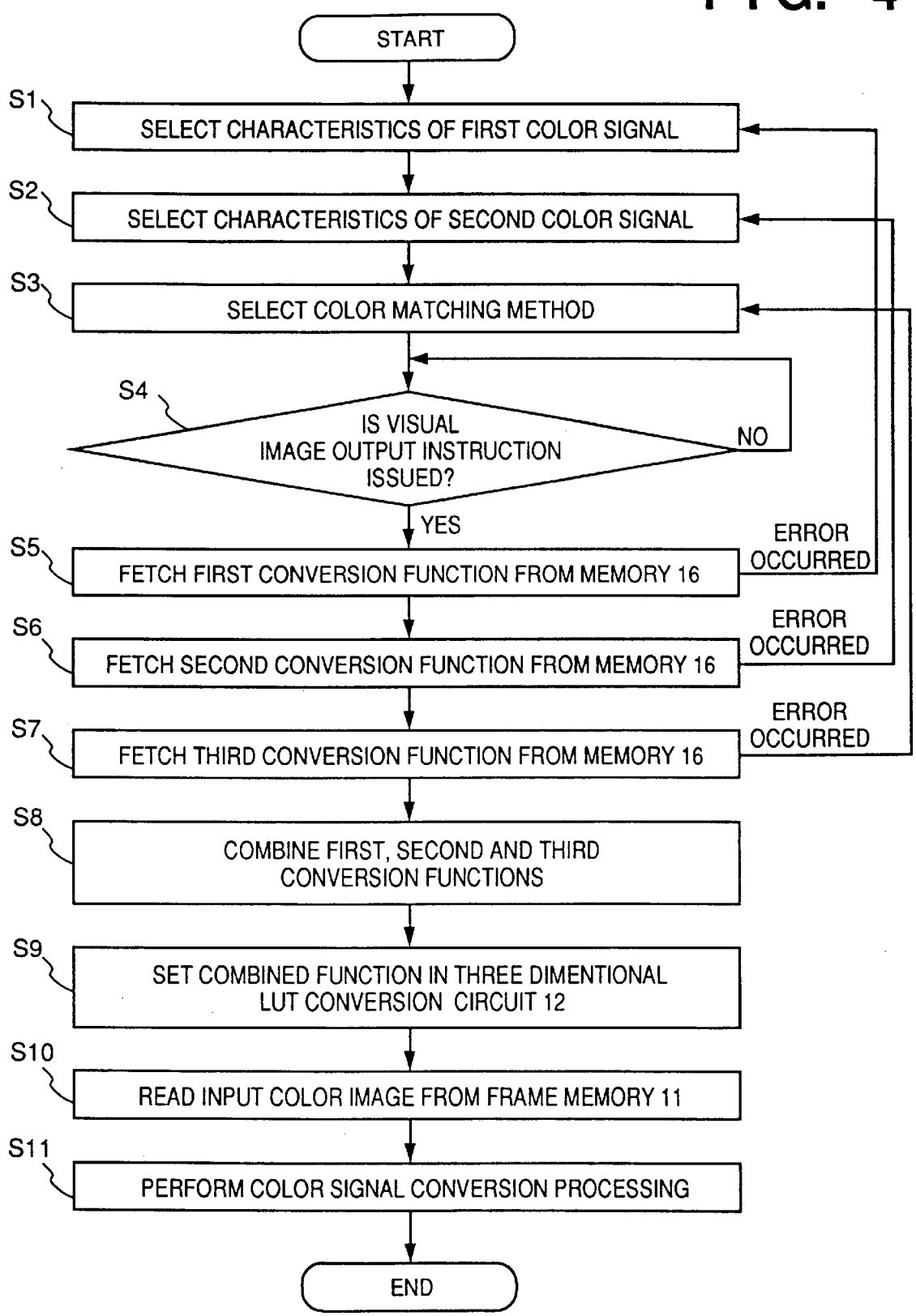
FIG. 4 is a flowchart briefly showing color conversion processing executed by a CPU 15.

Next, an operation of the color conversion unit 2 having the aforesaid configuration will be explained with reference to a flowchart shown in FIG. 4. FIG. 4 is the flowchart briefly showing a brief color conversion processing executed by the CPU 15.

The color conversion processing converts a first color image signal, stored in the frame memory 11, which is a display color signal of the CRT color monitor 10 into a third color image signal which is an output color signal to the printer 14 used for permanent visible representation, and output it. In this conversion processing, a first conversion function for converting the first color image signal into a standard color space signal, a second conversion function for converting the standard color space signal into a second color image signal, and a third conversion function for converting the standard color space signal, which is converted by the first conversion function, by color matching process based on a color gamut of an output device are selected in accordance with a processing which will be described later. Further, when the signal is outputted to the printer 14, the first to third conversion functions are synthesized, and the first color image signal is converted into the third color image signal by using the synthesized new conversion function.

Note that the color signal at the display 1 side is called "the first color signal", and the color signal at the color printer 14 side is called as "the record color signal", hereinafter. First at step S1, the CPU 15 selects characteristics of the first color signal, in accordance with an input designation, which is at the image input side stored in advance in a predetermined area, for instance, of the memory 16. This process corresponds to designation of color reproduction characteristics of the CRT monitor 10 in which an input image data is displayed, and this designation input is performed by a user or a maintenance engineer, for instance, by designating name of manufacturer and supplier, or of type of the device in a predetermined operational sequence.

The CPU 15 selects characteristics of the second color signal which is at the image output side stored in advance in a predetermined area, for instance, of the memory 16. This process corresponds to the designation of the color reproduction characteristics of the printer 14, and, similarly to step S1, the designation is performed by designating name of a manufacturer and a supplier, or type of the device.

After characteristics of these color signals have been selected, at step S3, there is selected a color matching method including a color space compression processing, based on the selected result, for converting the first color signal stored in the frame memory 11 into a color signal adjusted to a color gamut of the printer 14 which is the output device at the three dimensional LUT conversion circuit 12. The detail of this process will be described later.

When all the aforesaid processes are completed, the CPU 15 waits until the user inputs a visualized image output instruction at step S4. When the visualized image output instruction is issued by the user according to a predetermined operational sequence, the process moves to step S5, and the CPU 15 which received the instruction fetches the first conversion function from the memory 16 for converting the first color signal at the input side into the standard color space signal in accordance with the color characteristic information selected at step S1.

Successively, at step S6, the second conversion function for converting the standard color space signal into the second color signal at the output side is fetched from the memory 16 based on the color characteristic information selected at step S2. Further, at step S7, the third conversion function stored in the memory 16 for adjusting the standard color space signal to suit for the color gamut of the printer 14 is fetched based on the method selected at step S3, for instance.

In a case where it is discriminated in the conversion function selection processes at steps S5 to S7 that no corresponding conversion function is found in the memory 16 due to user's incorrect operation, unexpected designation, or the like, it is considered that an error occurred, and the process goes back to each conversion function selection process (corresponding selection processes of steps S1 to S3) Then the selection process for selecting a correct conversion function is repeated.

The conversion functions which are selected and fetched at aforesaid selection processes are explained below.

The first and the second conversion functions selected out of the conversion functions are three dimensional LUT conversion functions, and the LUT data is determined in advance in accordance with the color characteristics of the CRT color monitor 10, the color characteristics of the printer 14, and the definition of the standard color space, and the data values are stored in the memory 16.

Figure 5:
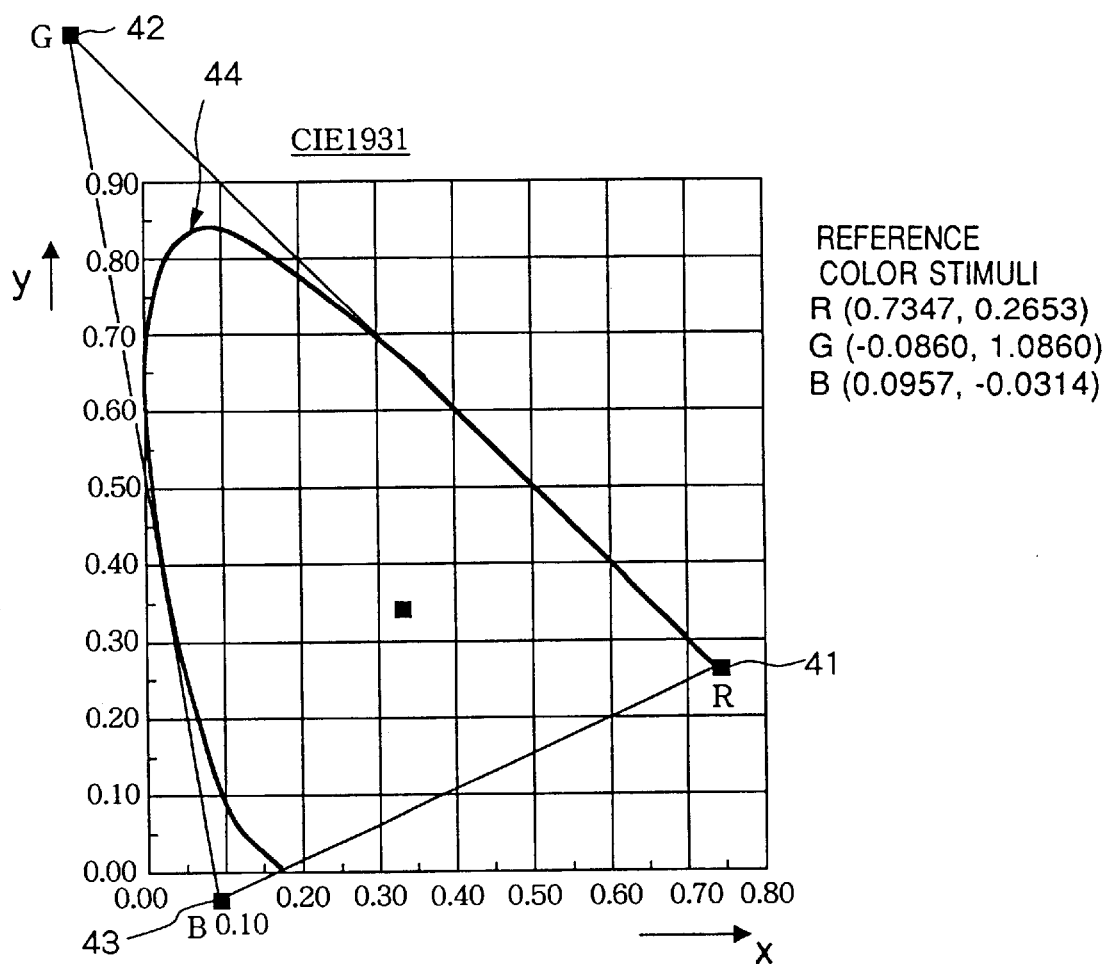
FIG. 5 is the CIE 1931—xy chromaticity diagram.

In this embodiment, in the CIE 1931—xy chromaticity diagram as shown in FIG. 5, a color space having three primary colors which are indicated by 41, 42, and 43 in FIG. 5, as reference color stimuli, is defined. Two main reasons for defining the color space as above in this embodiment are as following:

(a) Since a triangle having 41, 42, and 43 as its vertexes contains a spectrum locus 44, all the existing color signals can be dealt with.

(b) Since the spectrum locus 44 circumscribes the triangle having 41, 42, and 43 as its vertexes, there are not many cases to assign quantized bit numbers to non-existing colors, thus it is possible to reduce occurrences of quantization errors.

It should be noted that relationship between the input first color signal (R, G, B) and the standard color space signal (L, M, N) is defined by three dimensional functions, $F_L$, $F_M$, $F_N$, as the first conversion functions, selected in the aforesaid process, as follow.

$$L=F_L(R, G, B)$$

$$M=F_M(R, G, B)$$

$$N=F_N(R, G, B) \quad (1)$$

Further, the relationship between the standard color space signal (L, M, N) and the second color signal (R', G', B') as an output is also defined by three dimensional functions, $H_R$, $H_G$, $H_B$, as the second conversion functions as follow.

$$R'=H_R(L, M, N)$$

$$G'=H_G(L, M, N)$$

$$B'=H_B(L, M, N) \quad (2)$$

Furthermore, the relationship between the standard color space signal (L, M, N) and the standard color space signal (L', M', N') converted by a color matching process is defined by three dimensional functions, $K_L$, $K_M$, $K_N$, as the third conversion functions as follow.

$$L'=K_L(L, M, N)$$

$$M'=K_M(L, M, N)$$

$$N'=K_N(L, M, N) \quad (3)$$

Returning to the flowchart of FIG. 4, at step S8, the CPU 15 generates synthesized functions of the first to the third conversion functions selected at the processes of step S5 through step S7. At succeeding step S9, the LUT data based on the synthesized functions are written in the table memory 63 of the three dimensional LUT conversion circuit 12.

In the table memory 63, there is written output values corresponding to all the combination of the upper bits of input R, G, and B signals, more specifically, the values of the output signals R', G', and B' corresponding to all the input R, G, B signals where all the lower bits are 0. Therefore, the CPU 15 sequentially generates such R, G, B signals at step S9. Further, the CPU 15 finds L, M, and N corresponding each generated signal by using the equations (1), then L', M', and N' are found by substituting the obtained L, M, N into the equations (3), then the obtained L', M', N' are substituted into the equations (2) to obtain R', G' and B', finally the obtained values are written in the table memory 63. The aforesaid processes are repeated at step S9.

When the synthesized functions corresponding to all the combinations have been set, preparation for executing the color conversion process is completed, and the process by the CPU 15 proceeds to step S10.

At step S10, color signals R, G, B to be printed is read out of the frame memory 11 which stores the input color image designated to be printed out. Further, at step S11, the three dimensional LUT 12 performs color signal conversion in accordance with the synthesized functions set at step S9, and the converted color signals R', G', and B' are stored in the frame memory 13. Successively, the color converted color signals R', G', and B' are read from the frame memory 13, then outputted to the printer 14. The printer 14 performs a predetermined color conversion process to convert the input R', G', B' brightness signals into corresponding Y, M, C, and K density signals, then forms an image for permanent visible representation.

Regarding selection of the color matching method at step S3, the detail will be described with reference to FIG. 6.

Figure 6:
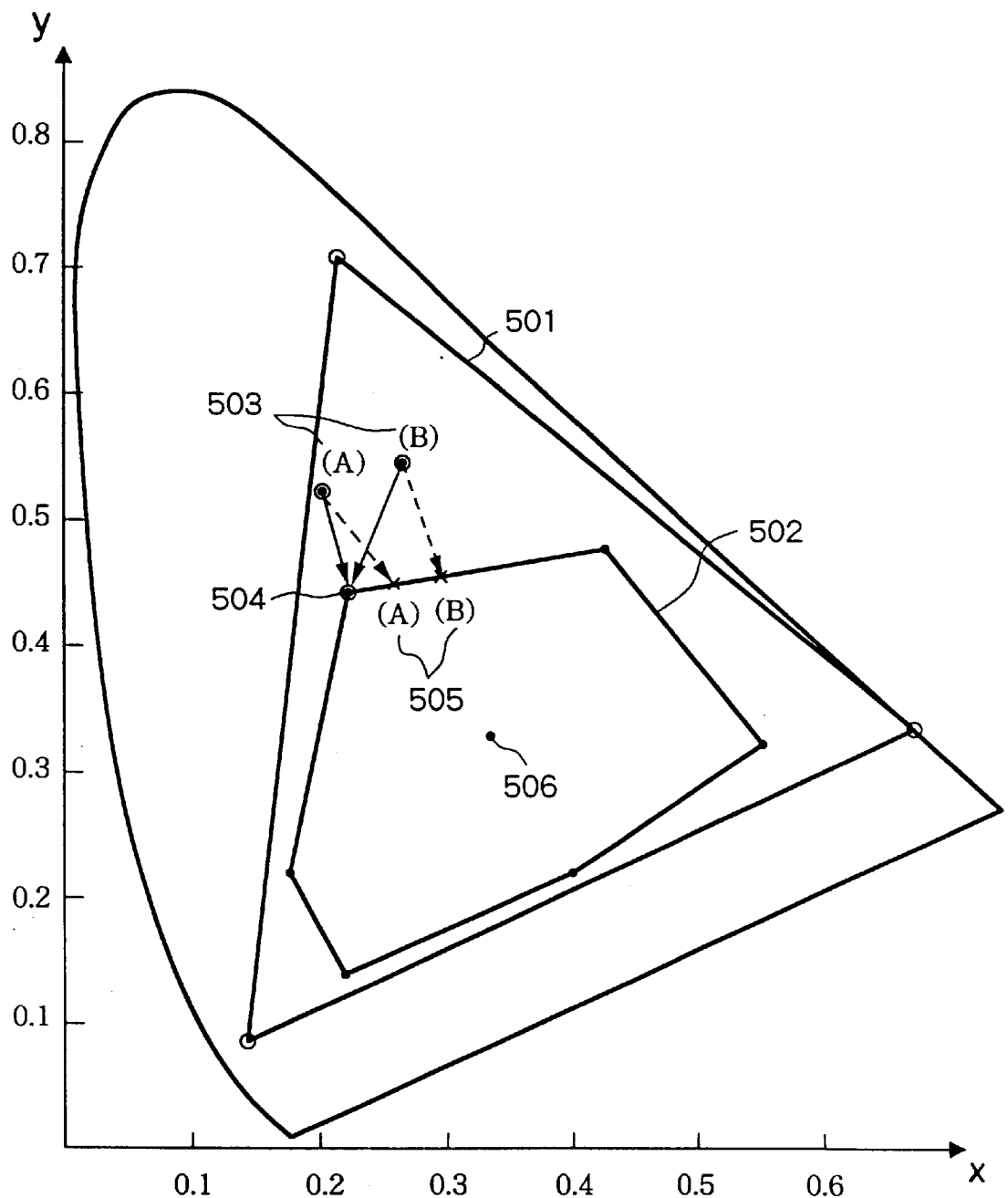
FIG. 6 shows typical color gamuts of a color monitor and of a color printer expressed in the CIE 1931—xy chromaticity diagram shown in FIG. 5.

FIG. 6 shows a color gamut of a typical color monitor and that of a typical printer in the CIE 1931—xy chromaticity diagram shown in FIG. 5. In FIG. 6, reference numeral 501 denotes the color gamut of the typical color monitor and reference numeral 502 denotes the color gamut of the typical printer.

As shown in FIG. 6, the input color image signals as color signals inside of the expressible range of the color monitor includes color signals, represented by points 503(A) and 503(B), which can not be reproduced by the printer. When these signals are printed out as an image without any particular processing, it is predicted that these signals may be printed out as a color on the outermost portion of the color gamut of the printer, as represented by a point 504 in FIG. 6.

Therefore, although the points 503(A) and 503(B) are originally displayed with the different colors on the color monitor, the corresponding printed colors are expressed with a single color which are represented by the point 504 in FIG. 6, thus these two different colors become indistinguishable.

Accordingly, by setting a correspondence relationship between color signals, included in input signals but not in a color gamut of an output device, and the points 505(A) and 505(B) in advance, for example, and by converting the color signals on the basis of the correspondence relationship, the colors printed on a record sheet can be distinguished. Note, that the correspondence relationship is not decided uniquely, but considered a plurality of conversion methods. Therefore, the conversion method is preferably selected by a user.

In this embodiment, it is the third conversion function, shown as the equations (3), that converts the input color signal expressed by the point 503 into the color signal expressed by the point 505. The equations (3) converts a standard color space signal by the color matching process, and several functions used as the equations (3) are prepared in advance in consideration with the aforesaid situations. The user can select one set of equations out of these functions.

Accordingly, the user can select the third functions in consideration with characteristics of an input image or user's preference, thus an image expressed with user's desired colors can be outputted.

In this embodiment, the functions having following characteristics are considered as the aforesaid conversion functions.

(a) Functions, when a standard color space signal (L, M, N) is converted into a signal in a space expressed by the xy chromaticity diagram and the converted result is outside of the color gamut of the output device, to obtain an intersecting point (point 505(A) or 505(B) in FIG. 6) of the color gamut border of the output device and a straight line connecting the non-chromatic point (point 506 in FIG. 6) and the point 503(A) or 503(B), then to de-convert coordinate of the intersecting point into the standard color space signal, and to find the de-converted value.

(b) Functions to convert the standard color space signal into a signal expressed in a uniform color space, such as an L* u* v* space, and, when the converted coordinate value (L*, u*, v*) expressed in the L* u* v* space is outside of the color gamut of the output device, to convert the coordinate value ($L_0^*$, u*, v*) into the coordinate point ($L_0^*$, u*', v*') where the color gamut border of the output device intersects with a straight line connecting the points of the coordinate values ($L_0^*$, u*, v*) and the coordinate values ($L_0^*$, 0, 0) on the L* axis, then to de-convert the obtained coordinate value (L*, u*, v*) into a standard color space signal, finally to find the de-converted value.

According to the embodiment as described above, the third conversion function is defined to perform a processing of adjusting the differences between the color gamut of the CRT color monitor 10 and the color gamut of the printer 14 regarding the first color signal. Therefore, it is easy to change, add, and select the processing for the adjustment.

Further, conversion functions in each processing can be selected anytime, thus a better color conversion can be performed in accordance with characteristics of a signal to be processed. Accordingly, it is possible to provide a color image processing method and apparatus capable of performing better color reproduction.

Furthermore, since an input image signal is converted by using synthesized functions of the first, second and third functions, deterioration of the image caused during the image conversion is reduced, thereby it is possible to obtain a better quality image. Further, according to the embodiment, it is possible to arrange a system capable of effectively adjusting the difference of color gamuts between different devices.

Figure 7:
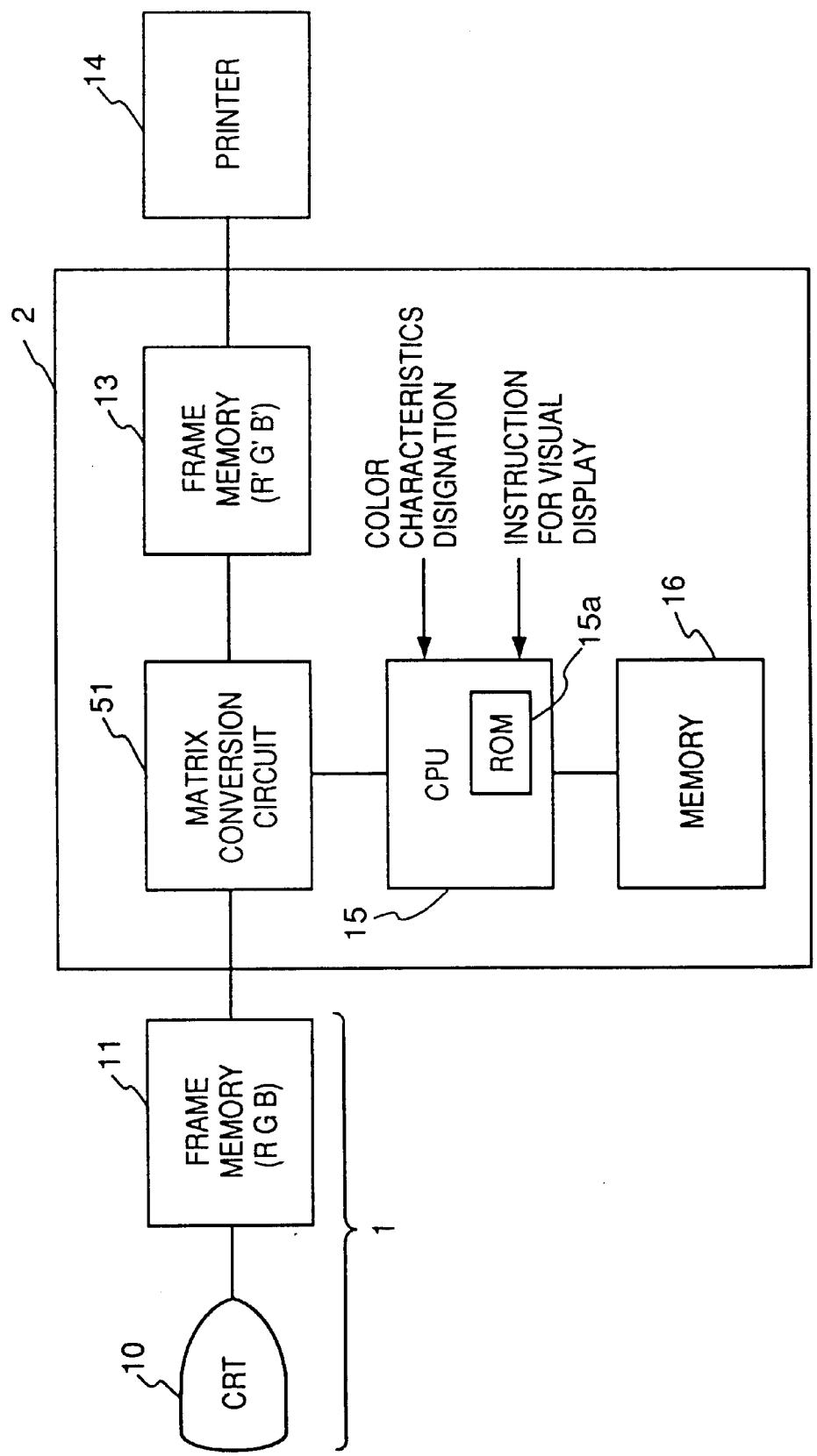
FIG. 7 is a block diagram illustrating a configuration of a color conversion unit 2 employing a matrix conversion circuit.

Note that the color conversion device of the embodiment converts a color signal by using a LUT, however, the present invention is not limited to this. For example, if the color conversion can be performed by a matrix operation, the device can be arranged by using a matrix conversion circuit 51 in the place of the three dimensional LUT circuit, as shown in FIG. 7.

For instance, if a first color signal (R, G, B) and a standard color space signal (L, M, N) are linearly related by a 3×3 matrix, a second color signal (R', G', B') and the standard color space signal are linearly related by another 3×3 matrix, and the standard color space signal (L, M, N) and the standard color space signal (L', M', N'), obtained after the color matching process, are linearly related by another 3×3 matrix, it is possible to obtain the second color signal (R', G', B') directly from the first color signal (R, G, B).

Furthermore, the color conversion in the embodiment can be performed by executing an application program by the CPU 15, without using a LUT and an operational circuit, thus the apparatus can be constructed to use the application program.

Figure 8:
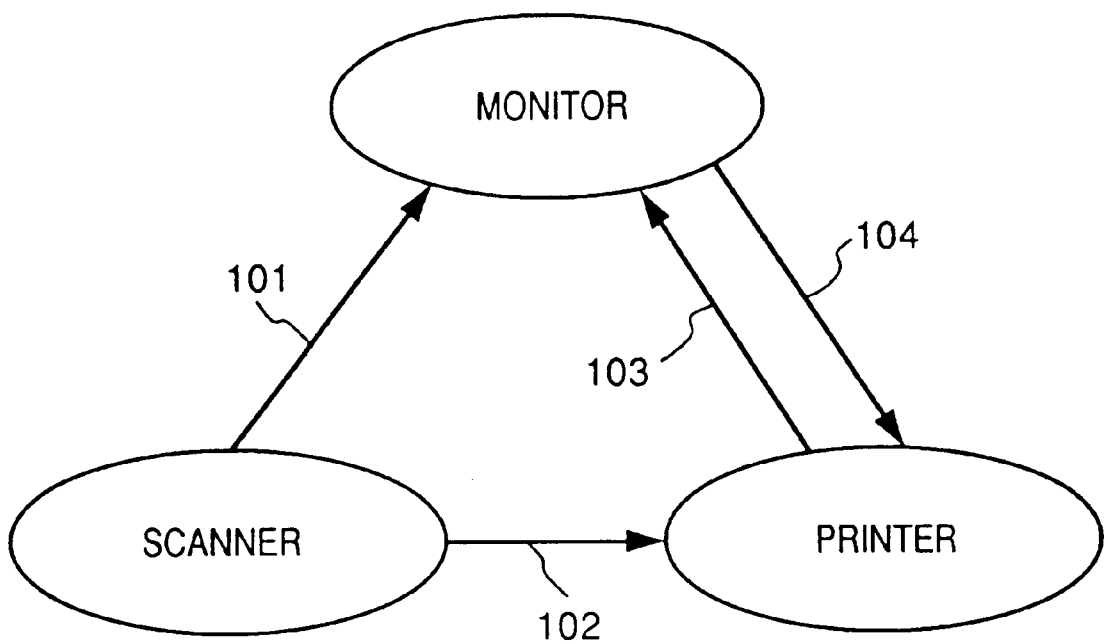
FIG. 8 is a diagram showing a relationship between devices for inputting and outputting color signal.

Further, as shown by 104 in FIG. 8, color conversion from a signal to be displayed on a monitor to another to be printed by a printer taking the differences between the color gamuts of the monitor and the printer into consideration is considered in the embodiment, however, the present invention is not limited to this. For example, the embodiment can be applied to difference between color gamuts of a scanner and monitor as shown by 101 in FIG. 8, difference between color gamuts of a scanner and a printer as shown by 102, and difference between color gamuts of a printer and a monitor, and a conversion function considering the scanner as an image signal input device can be the first conversion function, a conversion function considering the printer as an image signal output device can be the second conversion function.

Further, the present invention is not limited to the apparatus in which a user selects the characteristics of the first color signal and of the second color signal, and the image signal may be added with a header or the like in front of it so that characteristics of the color signal can be automatically selected in accordance with the instruction of the header or the like.

OTHER EMBODIMENT

In the above embodiment, on the assumption that the color gamut of the image signal input device differ from the color gamut of the image signal output device in the standard color space, the case where the difference is adjusted is described. Whereas, in this embodiment, a case where the difference between the color gamuts do not have to be adjusted depending upon the user's preference, or a case where the color gamuts of the image signal input/output devices do not substantially differ from each other, and where only the difference of the color characteristics between these devices have to be considered will be described.

Therefore, in the color conversion processing in this embodiment, the synthesized functions are obtained from the first and second conversion functions without considering the third functions described in the previous embodiment, and the first color signal (R, G, B) is converted into the second color signal (R', G', B') in accordance with the synthesized functions. Note that the apparatus having the same constitution as described in the previous embodiment is also used in this embodiment, thus the explanation of it is omitted. Further, the same processing steps of the color conversion process in this embodiment as those in the previous embodiment are referred by the same step reference numbers, and the explanation of them is also omitted.

First, the color conversion process using a matrix conversion circuit 51 as shown in FIG. 7 will be described.

In accordance with the input of a RGB signal, the matrix conversion circuit 51 converts the input RGB signal into a R'G'B' signal by using following equation:

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} R \\ G \\ B \end{bmatrix} \quad (4)$$

In the matrix, $a_{ij}$ (i, j=1~3) are determined according to following procedure.

Next, the determination process of the conversion coefficients $a_{ij}$ and the operation of the CPU 15 in the determination process will be described with reference to a flow-chart shown in FIG. 9.

First, at steps S1 and S2, characteristics of a color signal in the display 1 side (RGB signal) and characteristics of a color signal in the color printer 14 side (R'G'B' signal) are selected, respectively. After the selected characteristics are inputted into the CPU 15, the process proceeds to step S33 where the user inputs a visual display instruction to the CPU 15.

Next, triggered by the visual display instruction, the first conversion function and the second conversion function are fetched from the memory 16 at steps S5 and S6, respectively. When the corresponding conversion functions do not exist in the memory 16, the process goes back to step S1 or S2 as an error condition has occurred, similarly to the previous embodiment. The first and the second conversion functions perform the 3×3 matrix conversion similarly to the equation (4). Conversion coefficients of matrices are fixed in advance in accordance with the color gamut of the monitor, that of the printer, and the definition of such a standard color space that is already described with reference to FIG. 5. The values of the coefficients are stored in the memory 16.

Following equations are examples when conversion functions for converting the color signal (L, M, N) in the standard color space are obtained in consideration of the color gamuts of a typical monitor and a printer.

• First Conversion Function $$\begin{bmatrix} L \\ M \\ N \end{bmatrix} = \begin{bmatrix} 0.464 & 0.437 & 0.099 \\ 0.089 & 0.810 & 0.101 \\ 0.018 & 0.109 & 0.873 \end{bmatrix} \times \begin{bmatrix} R \\ G \\ B \end{bmatrix} \quad (5)$$

• Second Conversion Function $$\begin{bmatrix} R' \\ G' \\ B' \end{bmatrix} = \begin{bmatrix} 1.538 & -0.487 & -0.082 \\ -0.235 & 1.482 & -0.214 \\ 0.014 & -0.088 & 0.988 \end{bmatrix} \times \begin{bmatrix} L \\ M \\ N \end{bmatrix} \quad (6)$$

If the conversion coefficients of the equations (5) and (6) are stored in the memory 16 in advance, the CPU 15 reads the coefficients out of the memory 16, then the process proceeds to step S36.

At step S36, a new matrix which gives relationship between R', G', B' and R, G, B is generated by synthesizing the equations (5) and (6) as follow. In other words, by performing the following matrix operation, the conversion coefficients of the new matrix are found.

$$\begin{bmatrix} R' \\ G' \\ B' \end{bmatrix} = \begin{bmatrix} 1.538 & -0.487 & -0.082 \\ -0.235 & 1.482 & -0.214 \\ 0.014 & -0.088 & 0.988 \end{bmatrix} \times \begin{bmatrix} L \\ M \\ N \end{bmatrix} \quad (7)$$

$$= \begin{bmatrix} 1.538 & -0.487 & -0.082 \\ -0.235 & 1.482 & -0.214 \\ 0.014 & -0.088 & 0.988 \end{bmatrix} \times$$

$$\begin{bmatrix} 1.538 & -0.487 & -0.082 \\ -0.235 & 1.482 & -0.214 \\ 0.014 & -0.088 & 0.988 \end{bmatrix} \times \begin{bmatrix} R \\ G \\ B \end{bmatrix}$$

$$= \begin{bmatrix} 0.669 & 0.268 & 0.032 \\ 0.018 & 1.075 & -0.060 \\ 0.016 & -0.043 & 0.855 \end{bmatrix} \times \begin{bmatrix} R \\ G \\ B \end{bmatrix}$$

The conversion coefficients in the equation (7) constructs a function for directly converting the color signal in the input side (RGB signal) into a color signal in the output side (R'G'B' signal). The process moves to step S37 where the CPU 15 sets the coefficients ($a_{ij}$) of the obtained equation (7) in the matrix conversion circuit 51.

Further, at step S10, the input color image is read from the frame memory 11, and the color conversion processing is performed in accordance with the set coefficients ($a_{ij}$) at step S11.

In this embodiment as described above, there is set a conversion function that can define color characteristics of an image input device (a display in this embodiment) and of an image output device (a printer in this embodiment) to be connected to a system in a common standard color space, then determines a conversion function which expresses the input image signal from various devices or the output image signal to various devices by a linear transform representation in the standard color space. When the input and output devices are determined, there is generated a conversion matrix for directly connects the image input device and the image output device by using the conversion functions from/to input/output devices.

Therefore, according to this embodiment, after the color characteristics of the input and output devices, connected to the system, for inputting and outputting a color image is determined, the conversion matrix directly connecting the input and the output devices is generated by a simple designating operation to the CPU, and the color conversion can be performed by using the synthesized conversion matrix.

Note, in the embodiment, since both the first and the second conversion functions are 3×3 matrix conversion functions, the synthesized function can be easily obtained by multiplying the two matrices. However, in most cases, very complicated operations are necessary to obtain the synthesized function. Therefore, in order to correspond to such cases, the three dimensional LUT can be used as shown in FIG. 1 instead of the matrix conversion circuit 51 for converting a RGB signal into a R'G'B' signal by a simple operation, as explained in the previous embodiment.

In those cases, the relationship between the first color signal R, G, B and the standard color space signal L, M, N is defined by the three dimensional functions $F_L$, $F_M$, $F_N$, as the first conversion functions as the equations (1), and the relationship between the standard color space signal L, M, N and the second color signal R', G', B' as an output is also defined by the three dimensional functions, $H_R$, $H_G$, $H_B$ as the equations (2).

Figure 9:
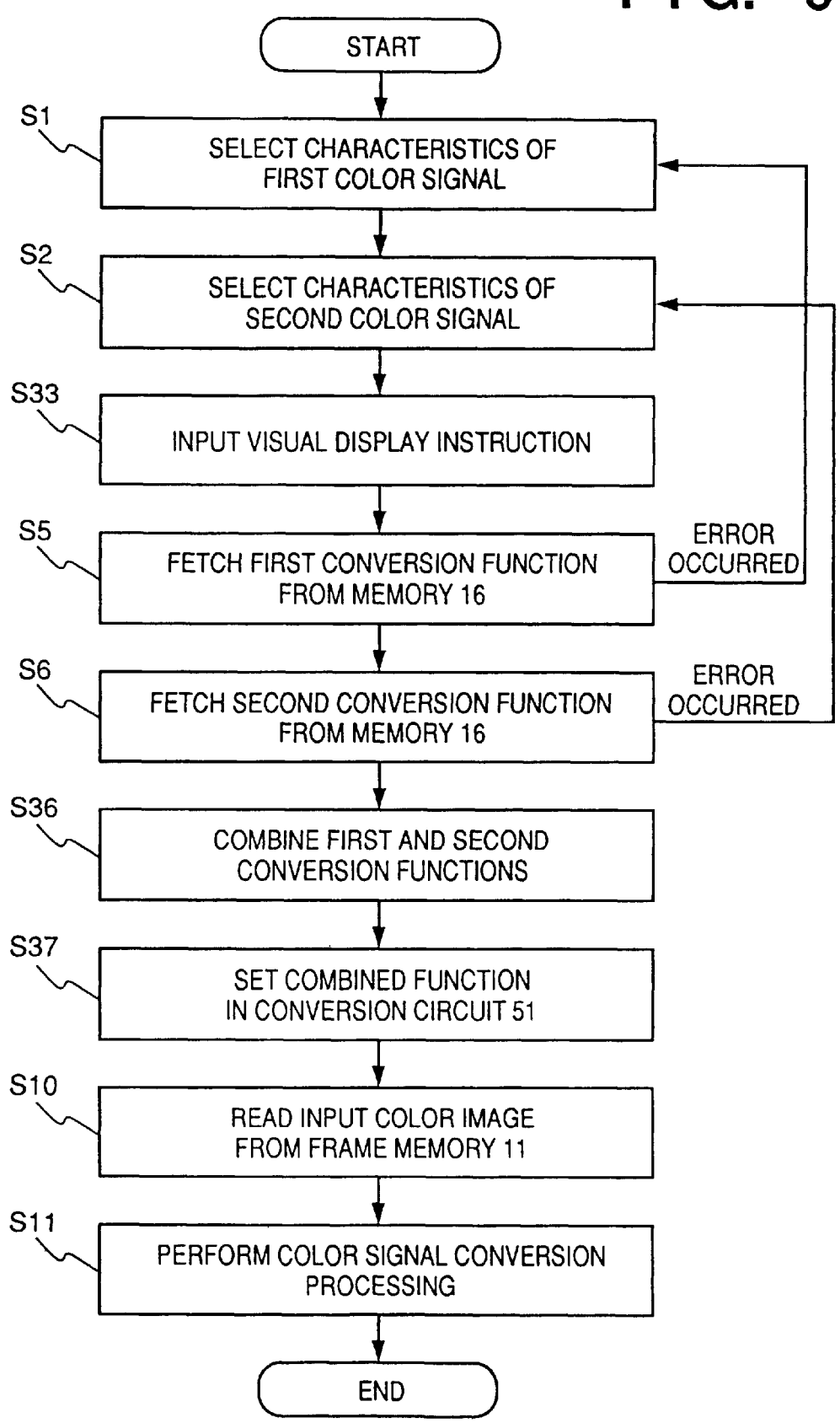
FIG. 9 is a flowchart briefly showing color conversion processing executed by a CPU 15 according to another embodiment.

The CPU 15 operates by following the flowchart in FIG. 9, and in the flowchart, synthesized functions of the equations (1) and (2) are generated at step S36, and the results are written in the table memory 63 of the three dimensional LUT conversion circuit 12 at step S37.

Similarly to the previous embodiment, in those cases, output values corresponding to all the combination of the upper bits of all input RGB signals, more specifically, output signal values of R', G', and B' corresponding to all the RGB input signals having all 0's in their lower bits have to be written in the table memory 63. Therefore, the CPU 15 sequentially generates values of such RGB signals, applies the equation (5) to each value of the RGB signal to obtain L, M and N, then finds R', G', B' by substituting the L, M, and N into the equations (6), finally writes the obtained values into the table memory 63. These processes are repeated.

When the writing process for all the combination is completed, the same processes as in the previous embodiment are performed at steps S10 and S11.

By constructing the apparatus as described above, the color conversion is performed by using the LUT, therefore color conversion can be performed without performing complicated operations even if there exists a complicated conversion relationship between the color characteristics of the input and output devices and the standard color space. This results in performing the color conversion at high speed.

The above-described embodiment relates to a processing between a color display and a color printer, however, the present invention is not limited to this. For example, the present invention can be applied to various kinds combinations of image input devices and image output devices, e.g., a case of outputting a color image separated by a flat bed scanner to a color printer, or outputting the same color separated image obtained by the flat bed scanner on the CRT monitor, and the like.

Further, the present invention can be applied to a system having a "preview" system, for instance, which predicts and reproduces the output result on the monitor without actually printing out an image visualized from the color image data inputted from the image input device.

In such a preview system, it is necessary to define the following three color signal characteristics, namely, (1) color characteristics of an input device (such as a scanner or a monitor), (2) color characteristics of an output device for outputting a visualized image (such as a printer), and (3) color characteristics of a device for displaying a preview image (such as a monitor). If these (the first to third conversion characteristics) are defined on the standard color space, it is possible to convert the input color image signal into a color image signal for preview, as shown in FIG. 10, by using the conversion coefficients corresponding to each color characteristics in the standard color space.

More specifically, a color image signal to be outputted to the output device (such as a printer) is converted into an image signal in the standard color space by using a fourth conversion function, then further converted into a color image signal for a preview image display device (such as a monitor) by using a fifth conversion function.

Figure 10:
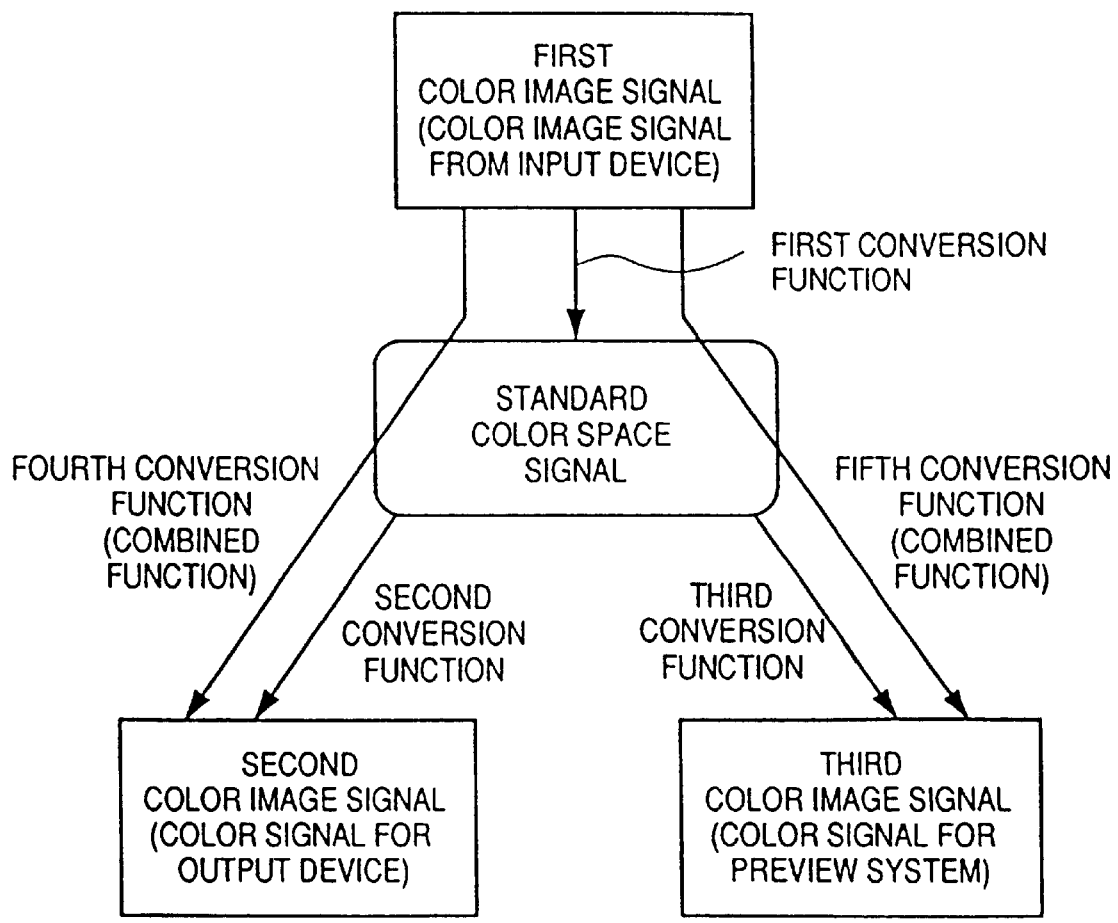
FIG. 10 is a diagram showing a relationship of color conversion in a preview system.

Therefore, in the system shown in FIGS. 1 and 7, by constructing the CPU so as to input color characteristics of the three devices, synthesize the three conversion functions (the first to third conversion functions) shown in FIG. 10 into a new function, and connect to the preview image display apparatus, a visualized preview image can be easily displayed.

It should be noted that the color conversion in the above embodiments are performed by using an operational circuit or the LUT, however, the present invention is not limited to this. For example, the color conversion can also be performed by executing an application program.

The aforesaid two embodiments describe the apparatuses constructed so that (1) when the color gamuts of the image signal input device and of the image signal output device differ, the difference is adjusted by using the first to third conversion functions and (2) when difference in the color gamuts do not have to be adjusted in accordance with the user's preference, or color gamuts of the image signal input device and of the image signal output device do not substantially differ from each other, thus only the color characteristics of the two devices have to be considered, the color characteristics of the image input device is converted into the color characteristics of the image output device by using the first and the second conversion functions. In addition, the apparatus can be constructed as follow.

Figure 11:
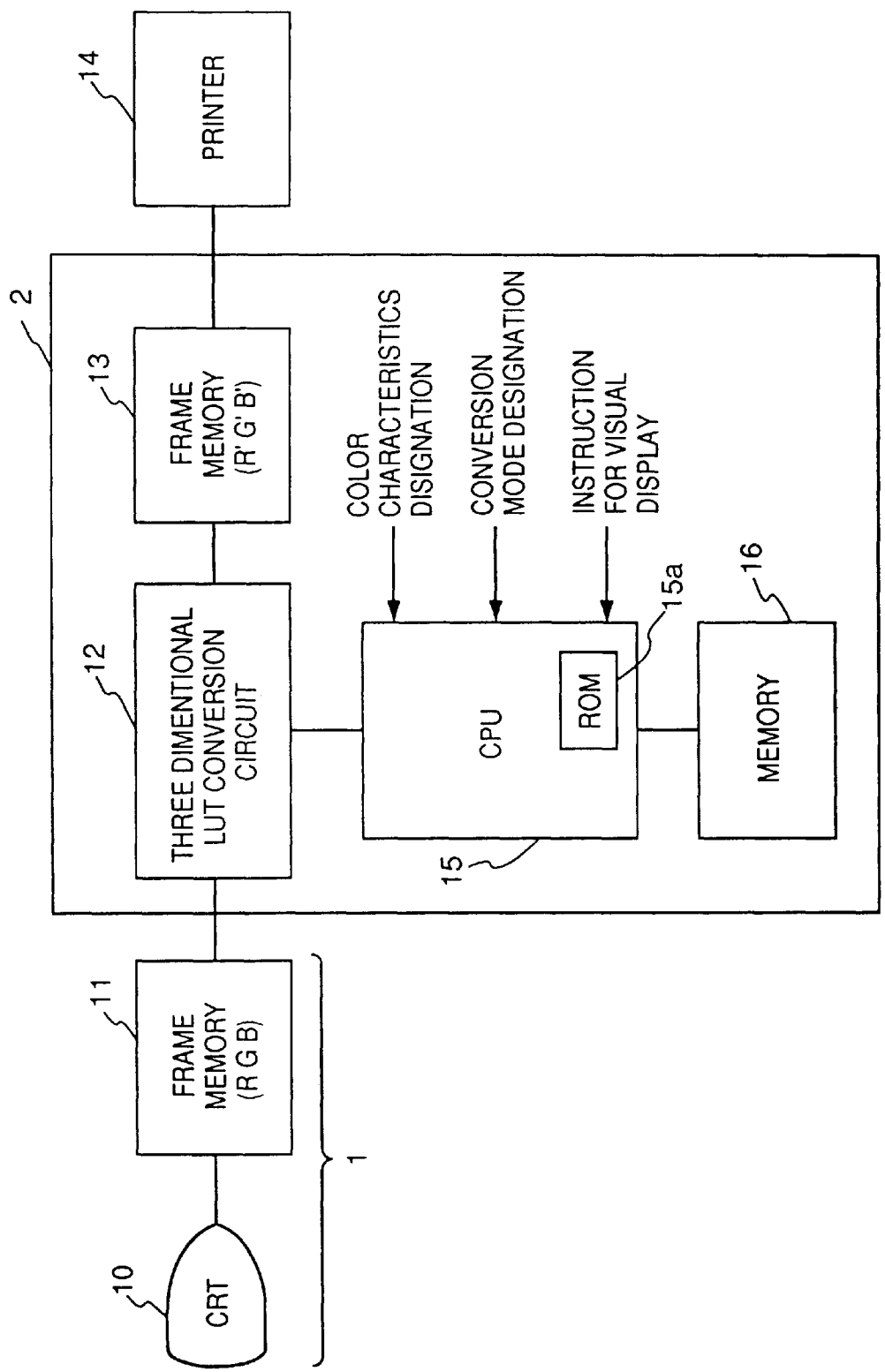
FIG. 11 is a block diagram illustrating a configuration of a color conversion unit 2 having a mode switching function.

Namely, the apparatus may be provided with two conversion modes, one of which is for performing the color conversion by using the first to third conversion functions, which corresponds to the aforesaid case (1), and the other is for performing the color conversion by using the first and second conversion functions, which corresponds to the aforesaid case (2) depending upon the color gamuts of the image input/output devices to be used and the user's preference, and the two modes can be changed over. The change over of the modes can be performed by constructing the apparatus so that the user can designate one of the conversion modes, as shown in FIG. 11.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image processing method comprising the steps of:
   first selecting a first color processing function defining color characteristics, based on a standard color space, of an input unit;
   second selecting a second color processing function defining color characteristics, based on the standard color space, of a display unit;
   third selecting a third color processing function defining color characteristics, based on the standard color space, of an image formation unit;
   selecting either a first mode for previewing by synthesizing the selected first, second and third color processing functions or a second mode for previewing by synthesizing the selected first and second color processing functions in accordance with an instruction from a user;
   synthesizing either the selected first, second and third color processing functions or the selected first and second color processing functions so as to generate a composed color processing function in accordance with the selected mode;
   performing color processing on input image data, by using the composed color processing function so as to generate image data for preview; and
   outputting the image data for preview, into the display unit so that the display unit can preview an image to be formed by the image formation unit;
   wherein, in a case where color gamuts of the input unit and of the image formation unit differ and the user does not accept a difference between the color gamuts, the first mode is selected in said selecting step, and in a case where the user accepts the difference between the color gamuts or the color gamuts do not differ substantially from each other, the second mode is selected in said selecting step.

2. The method according to claim 1, wherein the first, second and third color processing functions are in a form of multi-dimensional look up tables (LUTs).

3. The method according to claim 1, wherein the first, second and third color processing functions are in a form of matrices, each containing coefficients.

4. An image processing apparatus comprising:
   first selection means for selecting a first color processing function defining color characteristics, based on a standard color space, of an input unit;
   second selection means for selecting a second color processing function defining color characteristics, based on the standard color space, of a display unit;

third selection means for selecting a third color processing function defining color characteristics, based on the standard color space, of an image formation unit;

mode selection means for selecting either a first mode for previewing by synthesizing the first, second and third color processing functions selected by said first, second and third selection means or a second mode for previewing by synthesizing the first and second color processing functions selected by said first and second selection means in accordance with an instruction from a user;

composition means for synthesizing either the first, second and third color processing functions selected by said first, second and third selection means or the first and second color processing functions selected by said first and second selection means so as to generate a composed color processing function in accordance with the mode selected by said mode selection means;

color processing means for performing color processing on input image data, by using the composed color processing function so as to generate image data for preview; and output means for outputting the image data for preview, into the display unit so that the display unit can preview an image to be formed by the image formation unit, wherein, in a case where color gamuts of the input unit and of the image formation unit differ and the user does not accept a difference between the color gamuts, the first mode is selected by said mode selection means, and in a case where the user accepts the difference between the color gamuts or the color gamuts do not differ substantially from each other, the second mode is selected by said mode selection means.

* * * * *

UNITED STATES PATENT AND TRADEMARK OFFICE
CERTIFICATE OF CORRECTION

PATENT NO.      : 6,608,927 B2
DATED           : August 19, 2003
INVENTOR(S)     : Ken-Ichi Ohta It is certified that error appears in the above-identified patent and that said Letters Patent is hereby corrected as shown below:

<u>Title page,</u>
Item [62], Related U.S. Application Data, "1997, which" should read -- 1997, now U.S. Pat. No. 5,801,855, which --.

<u>Column 1,</u>
Line 5, "now allowed," should read -- now U.S. Pat. No. 5,801,855, --.

Signed and Sealed this

Seventeenth Day of August, 2004

JON W. DUDAS
*Acting Director of the United States Patent and Trademark Office*